United States Patent [19]
Apperson et al.

[11] Patent Number: 5,978,484
[45] Date of Patent: Nov. 2, 1999

[54] SYSTEM AND METHOD FOR SAFETY DISTRIBUTING EXECUTABLE OBJECTS

[75] Inventors: Norman Apperson, Bellevue; Brian C. Beckman, Renton, both of Wash.

[73] Assignee: Microsoft Corporation, Redmond, Wash.

[21] Appl. No.: 08/639,290

[22] Filed: Apr. 25, 1996

[51] Int. Cl.$^6$ ................................. H04K 1/00; H04L 9/00
[52] U.S. Cl. .................................................. 380/25; 380/4
[58] Field of Search ................................. 380/25, 24, 23, 380/4; 395/157

[56] References Cited

U.S. PATENT DOCUMENTS

| | | | |
|---|---|---|---|
| 4,868,877 | 9/1989 | Fischer | 380/25 |
| 5,005,200 | 4/1991 | Fischer | 380/25 |
| 5,214,702 | 5/1993 | Fischer | 380/25 |
| 5,311,591 | 5/1994 | Fischer | 380/4 |
| 5,412,717 | 5/1995 | Fischer | 380/25 |
| 5,412,774 | 5/1995 | Agrawal | 395/157 |
| 5,692,047 | 11/1997 | McManis | 380/4 |
| 5,745,574 | 4/1998 | Muftic | 380/25 |
| 5,825,877 | 10/1998 | Dan et al. | 380/25 |

OTHER PUBLICATIONS

Schneier, Bruce, "Applied Cryptography, Second Edition: Protocols, Algorigthms, and Source Code in C," (1996), pp. 574–577.

Bank, Joseph A., "Java Security," (Dec. 8, 1995), found at Internet URL http://swissnet.ai.mit.edu/~jbank/javapaper/javapaper.html/.

*Primary Examiner*—Benjamin R. Fuller
*Assistant Examiner*—Robin Clark
*Attorney, Agent, or Firm*—Lee & Hayes, PLLC

[57] ABSTRACT

The invention includes a method and system for distributing and executing executable code. Before sending executable code to a client, a distributing authority associates a privilege request code with the executable code. The privilege request code indicates a requested set of privileges that the executable code will potentially exercise during execution. The distributing authority digitally signs the executable code and associated privilege request code and then distributes it for eventual execution by clients. Before executing the executable code, a client verifies the digital signature to confirm the authenticity and integrity of the executable code and associated privilege request code. This verification utilizes a hierarchy of certifying authorities. While the code executes, the client monitors it and prevents it from exercising privileges that are not in the requested set of privileges.

20 Claims, 4 Drawing Sheets

SYSTEM AND METHOD FOR SAFETY DISTRIBUTING EXECUTABLE OBJECTS

TECHNICAL FIELD

This invention relates to client-server environments in which executable objects are downloaded or otherwise distributed from a distributing authority and executed on a different computer.

BACKGROUND OF THE INVENTION

There has been a dramatic increase in reliance upon service providers accessible via electronic data communications networks such as the Internet. Such service providers are generally interested in providing access to the widest possible client audience at the lowest cost. Very recently, a number of solutions have emerged that allow service providers to achieve these goals. In particular, there has been very rapid growth in the use of the standardized hypertext capabilities of the World Wide Web (WWW) on the Internet. The standardized nature of the WWW, as well as the very low costs involved in accessing the Internet, have eliminated many of the previous hurdles to service development and distribution.

While the Internet's World Wide Web and other similar environments allow service providers to build systems that can efficiently deliver information to potentially large numbers of clients, they also impose limitations. These limitations are a direct consequence of the desire to provide a simple, generic processing model for multiple purposes.

It has been recognized that these limitations can be addressed to some degree by allowing servers to send executable code to clients, for execution by the clients themselves. This allows a server to build client software for a specific purpose, thereby allowing the service provider to add functionality to existing client software. An advantage of this approach is that it can in many cases reduce both the processing burdens on the server and the communications requirements between the server and the client.

While it might be very desirable for a client to execute server-provided software, the potential threat to security is a serious drawback. For a client to be willing to execute server-defined functionality, the client must be assured that no adverse effects will occur. Specifically, there must be a guarantee that existing client data will not be read or modified and that hostile code (viruses, Trojan horses, etc.) will not be generated and installed on the client system.

This is particularly problematic in the public network environment since mechanisms for establishing trust between a client and server are not widely deployed, and data communications channels are open to eavesdropping and tampering. Because of this, general purpose compiled programming languages are not a solution. It is inherently unsafe in a public network environment for a client to accept binary executable images from a server and execute them. Since the server-provided programs would have access to the full resources of the client computer environment, they could potentially perform any of various different types of dangerous or hostile operations.

Binary executable code also has the disadvantage of being architecture-specific. It is a significant complication for the server to determine the computer hardware in use by the client and the operating system, and to provide different executable modules for use with different systems.

These issues lead naturally to consideration of an interpreted language. This approach allows a server to create program scripts that can be executed on the client to extend its functionality, while providing a more controlled execution environment and architecture neutrality. Interpreters can be implemented on a variety of computer platforms and operating systems to provide an isolation layer between the language specification and the underlying architecture. Hence, a server can provide scripts for extensions that are executable on a variety of client machines. Interpreters can also perform runtime checking of various sorts to enforce access of specific resources and to detect when scripts have been tampered with. Sun Microsystem's recently announced Java language is an example of this approach.

From a client's perspective, the optimal situation is one in which it needs only trust the interpreter. Once a client has an interpreter from a trusted source, the client should be able to execute any script with complete safety. This is where existing approaches fail. Java, for example, is a general purpose programming environment which allows the generation of complex applications including I/O operations. Java is specifically designed to allow easy access to network facilities, hence it has the potential to surreptitiously transmit client confidential information; destroy client data, and perform other hostile actions. The protection against such behavior relies on the ability to validate Java scripts and determine their authenticity. Importantly, however, Java and many other systems rely on a trust relationship between the server and the client as the basis for their safety. We believe that this is a significant limitation which our invention addresses.

In addition to eliminating the requirement of a trust relationship between the client and server, our invention provides for situations in which a client may wish to execute server-provided code that performs I/O and other potentially dangerous operations. Our invention provides a secure extension mechanism that enables servers to download general purpose executables with full client validation of their origin and authenticity.

SUMMARY OF THE INVENTION

The invention classifies different types of security-related operations and services, which might potentially be performed by externally-provided code, into different categories. When providing executable code, a distributing authority also provides a privilege request code, indicating a set of privileges or privilege categories that the executable code might perform on the client machine. The distributing authority digitally signs the executable code and the privilege request code, and also provides a certificate that can be traced by the client to a known certifying authority. The certificate indicates an authorized set of privileges that the distributing authority has been authorized to include in distributed code.

The certificate is issued to the distributing authority by a certifying authority that is a member of a hierarchy of authorities. The certificate is signed by the certifying authority, and includes or refers to the certificate of an even higher certifying authority. Each certificate therefore relies for its verification upon a higher certifying authority, except for a root authority that is known to be trustworthy.

Each certificate indicates an authorized set of privileges that the holder of the certificate is authorized pass on to lower members of the hierarchy. When a distributing authority distributes actual executable code, the associated privilege request code must indicate a subset of the privileges indicated by the privilege authorization code of the certificate held by the distributing authority. Before executing code provided from some external source such as a server, the client traces the authority of the distributing authority that signed the code, through one or more certifying authorities to one that is known to the client independently of the server. For each certifying authority, the client verifies that the privilege authorization code indicates privileges that are a subset of the privileges indicated by the certificate of the next-higher certifying authority.

If the client verifies the signature and digital certificate of the distributing authority by tracing to an authority that is already known to the client, the client executes the provided code. However, it monitors the code, and prevents it from exercising any privileges that are not indicated in the associated privilege request code.

In practice, the client creates a granted privilege set for a particular executable object, and prevents the object from exercising any privileges not in the granted privilege set. The granted privilege set is preferably created by intersecting the privilege authorization sets from the digital certificate of the distributing authority and of any higher authorities encountered while tracing the certificate of the distributing authority. Any failure while checking the authority of the distributing authority results in an empty granted privilege set. Every executable statement in the executable object is then checked against the granted privilege set before execution.

DETAILED DESCRIPTION OF THE PREFERRED EMBODIMENT

The invention described below utilizes well-known digital encryption and signing techniques. The following discussion therefore assumes familiarity with these topics. For example, the invention utilizes public-key cryptography techniques such as described in Schneier, Bruce; *Applied Cryptography Second Edition: Protocols, Algorithms, and Source Code in C*; New York: John Wiley & Sons, 1996, which is hereby incorporated by reference. Particularly, the invention utilizes the RSA (Rivest, Shamir, and Adlemen) public-key algorithm for digital signatures, in conjunction with a hashing algorithm referred to as SHA (secure hash algorithm), although other public-key signature schemes, such as DSS, ElGamal, Elliptic Curve, can alternatively be used.

Figure 1:
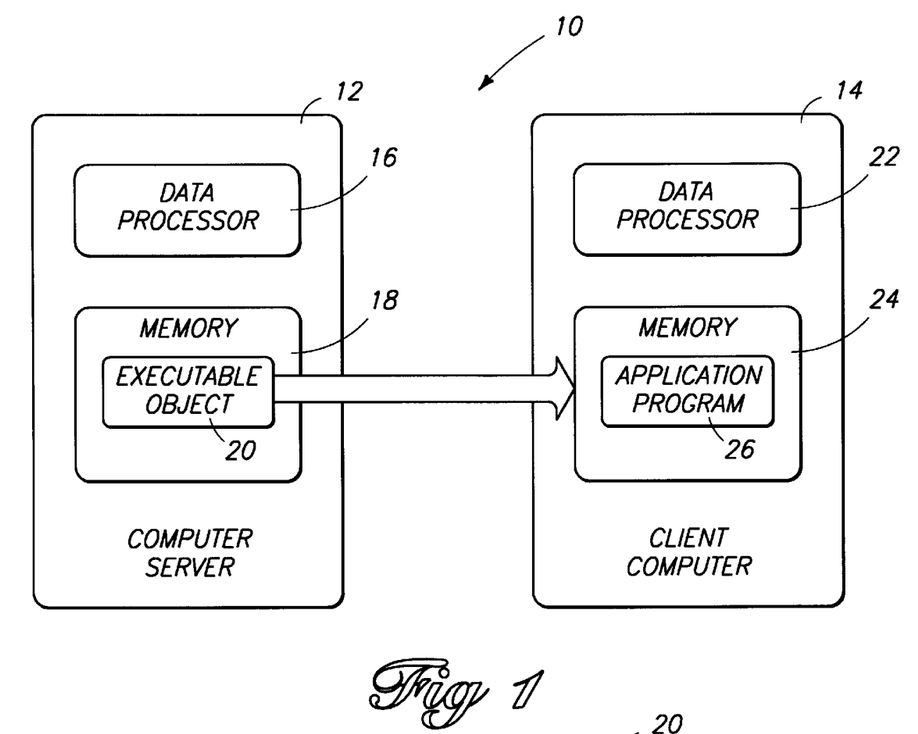
FIG. 1 is a block diagram of a computer system in accordance with the invention.

FIG. 1 shows a computer system 10 in accordance with a preferred embodiment of the invention. Computer system 10 includes a computer server 12 and a client computer 14. Computer server 12 includes a data processor 16, a computer-readable storage medium or memory 18, and other components (not shown) typical of a computer network server. Memory 18 includes both electronic and magnetic or optical mass storage memory.

Computer server 12, in this case also referred to as a distributing authority, is configured to provide or distribute one or more signed executable objects 20 for execution by client computer 14. An object 20 is initially stored by server 12 in memory 18. Computer server 12 is connected to download such executable objects to client computer 14 over a communications channel or link, such as a local area network connection, a wide area network connection, or a remote connection from an online service provider. The executable objects comprise both executable code and associated data. The code might be in the form of textual scripts, byte codes, P-code, or binary object code.

Client computer 14 is similarly connected to download and execute executable objects 20 from the computer server. Client computer 14 includes a processing unit or data processor 22 and memory 24. Memory 24 includes electronic and optional mass-storage memory such as a magnetic or optical storage medium. Client computer 14 includes other components (not shown) such as are commonly incorporated in a personal or desktop computer.

An application program 26 executes on data processor 22 from memory 24. The application program in the preferred embodiment of the invention is a client program that interacts with computer server 20. As an example, application program 26 might be a "browser" application such as is commonly used to access resources on a public network such as the Internet or on a private "intranet." The client program is configured to accept and execute executable code provided by computer server 20.

Figure 2:
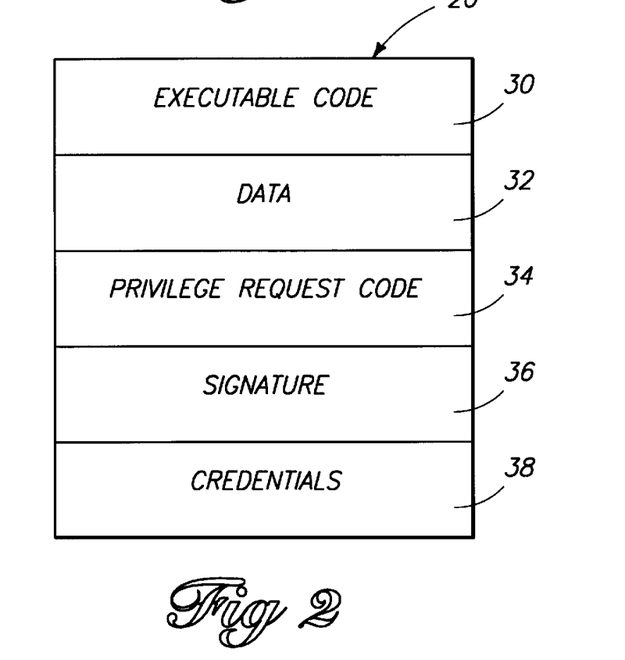
FIG. 2 is a block diagram of an executable object in accordance with the invention.

FIG. 2 shows preferred components of executable object 20. The object includes executable code 30, associated data 32, a privilege request code 34, a digital signature 36, and digital credentials 38.

Privilege request code 34 is a code that indicates a set of security-related privileges that executable code 30 of object 20 will potentially execute on client 14. The facilities of the client operating system or script interpreter are divided up into a set of privileges or privilege classes. In the Windows NT® operating system for example, these privilege classes might relate individually to file I/O, network operations, registry read/write rights, graphics operations, window management, and user list read/write rights. The privilege request code indicates which of these classes of services are potentially required by executable code 30.

Digital signature 36 is a digital signature of the concatenated executable code, data, and privilege request code from the executable object 20. More particularly, this is an RSA-encrypted SHA-hash of the concatenated executable code, data, and privilege request code. This signature can be verified by a client computer to confirm the authenticity and integrity of the executable code, data, and associated privilege authorization code. As will be explained more fully below, the digital signature has the further important property that it can be verified without relying on the trustworthiness of server 12.

Credentials 38, associated with the server computer or distributing authority, include a privilege authorization code indicating which privileges or privilege classes are allowed to be exercised by code distributed from server 12 or another distributing authority. The credentials are issued to server 12 or to a distributing authority by one or more certifying authorities and are digitally signed by the certifying authorities. The digital signature of at least one of the certifying authorities can be verified by the client without relying on the trustworthiness of the server or other distributing authority, as will be demonstrated below.

The certifying authorities are responsible for verifying the trustworthiness of the distributing authority that provided the executable code and the level of trust that should be placed in the executable code and distributing authority. More specifically, the certifying authorities determine which privileges any particular server or distributing authority should be allowed to authorize. For instance, a certifying authority might issue credentials to one distributing authority allowing it to distribute code that exercises a full range of security-related privileges on a client computer, while the executable code from another distributing authority might be precluded from performing file I/O.

Note that in the case shown in FIG. 1, server 12 is a distributing authority. While this configuration has advantages, executable code might be signed by a distributing authority that is independent of the actual server that provides the code to client 14. In fact, the distribution path from a distributing authority to a client computer might take many forms. In the example shown, the distribution path is a network connection formed between a server (acting as the distributing authority) and a client of the server. In other cases, the executable code might be distributed by floppy disk or some other portable storage medium from a distributing authority to a user's computer. In still other cases, the executable code might be provided to various online servers from the distributing authorities, and users would obtain the executable code from the servers. In each of these cases, the executable code and associated privilege request code would be signed by the distributing authority, even though the code might be obtained by a user from an entity that has no direct connection to the distributing authority—such as an independent online service provider. In this latter, case, the online service provider would act as a code repository, without participating directly in security measures. Thus, while the service provider might not wish to participate in the security scheme described herein, a client computer could nevertheless rely on the verifiable digital signature of the distributing authority to establish the trustworthiness of the executable code.

Figure 3:
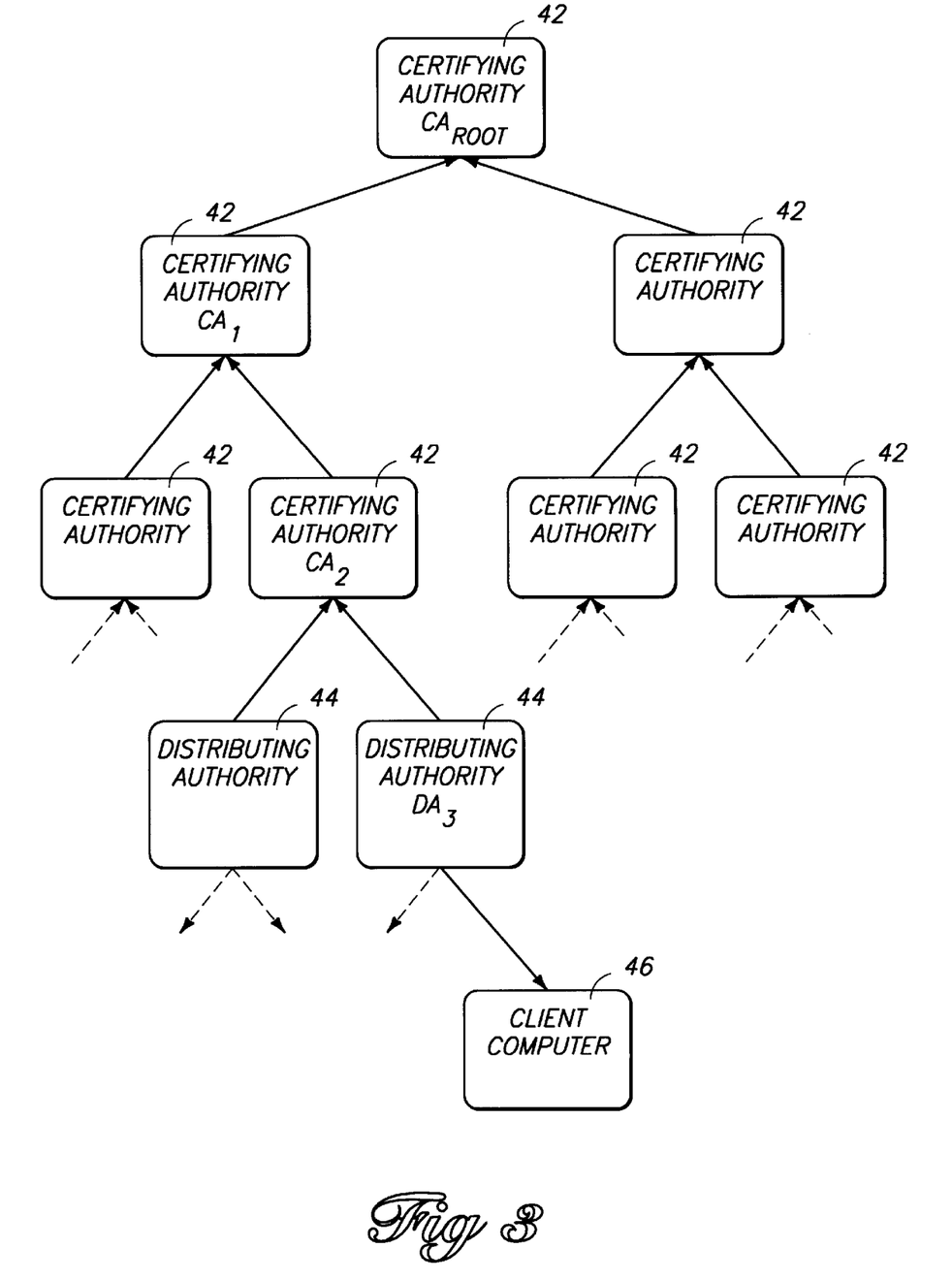
FIG. 3 is a block diagram of a hierarchy of authorities in accordance with the invention.

The certifying authorities and distributing authorities are members of a hierarchy of authorities as shown in FIG. 3. The members of the hierarchy have different levels of authority, depending on their positions in the hierarchy and the privileges granted them by higher levels of the hierarchy. The structure of the hierarchy resembles a tree structure, with a "root" member at the top connected to lower "leaf" members by "branches." This "tree of trust" is utilized to verify signatures of distributing authorities and certifying authorities, and to verify the authority of a distributing authority to distribute code with a particular privilege request code.

At the top of the hierarchy is a "root" certifying authority 40, also designated $CA_{ROOT}$. This entity has authority over all possible privileges that an executable object might potentially exercise. Beneath the root are different levels of certifying authorities 42, including a plurality of distributing authorities 44. Each certifying authority has authority over a potentially different set of privileges.

Each certifying authority and distributing authority is assigned a privilege authorization code by the next-higher certifying authority in the hierarchy. The privilege authorization code of any particular authority indicates a set of privileges that can be authorized by that authority. In addition, the privilege authorization code indicates whether an entity is authorized to certify lower members of the hierarchy and whether the entity is authorized to act as a distributing authority. The privilege authorization code held by any particular entity must indicate a subset of the privileges indicated by the privilege authorization code of the next-higher authority.

In general, any certifying authority can also act as a distributing authority. When acting as a certifying authority, an entity grants or assigns privilege authorization codes to lower members of the hierarchy. The granted privilege authorization codes must indicate a subset of the privileges indicated by the certifying authority's own privilege authorization code. When acting as a distributing authority, an entity distributes executable objects that include privilege request codes. Each such privilege request code must indicate a subset of the privileges indicated by the distributing authority's privilege authorization code.

With this structure, each lower level of authority in the hierarchy potentially has less and less authority for granting privileges to other members of the hierarchy or for distributing executable objects.

In the example of FIG. 3, a client computer 46 receives an executable object from a distributing authority 44 designated as $DA_3$. The executable object is signed by $DA_3$ and includes the privilege authorization code of $DA_3$. Distributing authority $DA_3$, in turn, receives its privilege authorization code from a certifying authority $CA_2$; $DA_3$'s privilege authorization code is a subset of $CA_2$'s privilege authorization code. $CA_2$ receives its privilege authorization code from a higher certifying authority $CA_1$, and $CA_1$ receives its privilege authorization code from the root certifying authority $CA_{ROOT}$. $CA_{ROOT}$ has a privilege authorization code that includes all possible privileges that might be exercised by executable objects.

To enforce this scheme, the authority of each certifying authority and distributing authority is recorded in a digital certificate, issued and signed by the next higher member of the hierarchy. The credentials discussed above comprise such a digital certificate.

Figure 4:
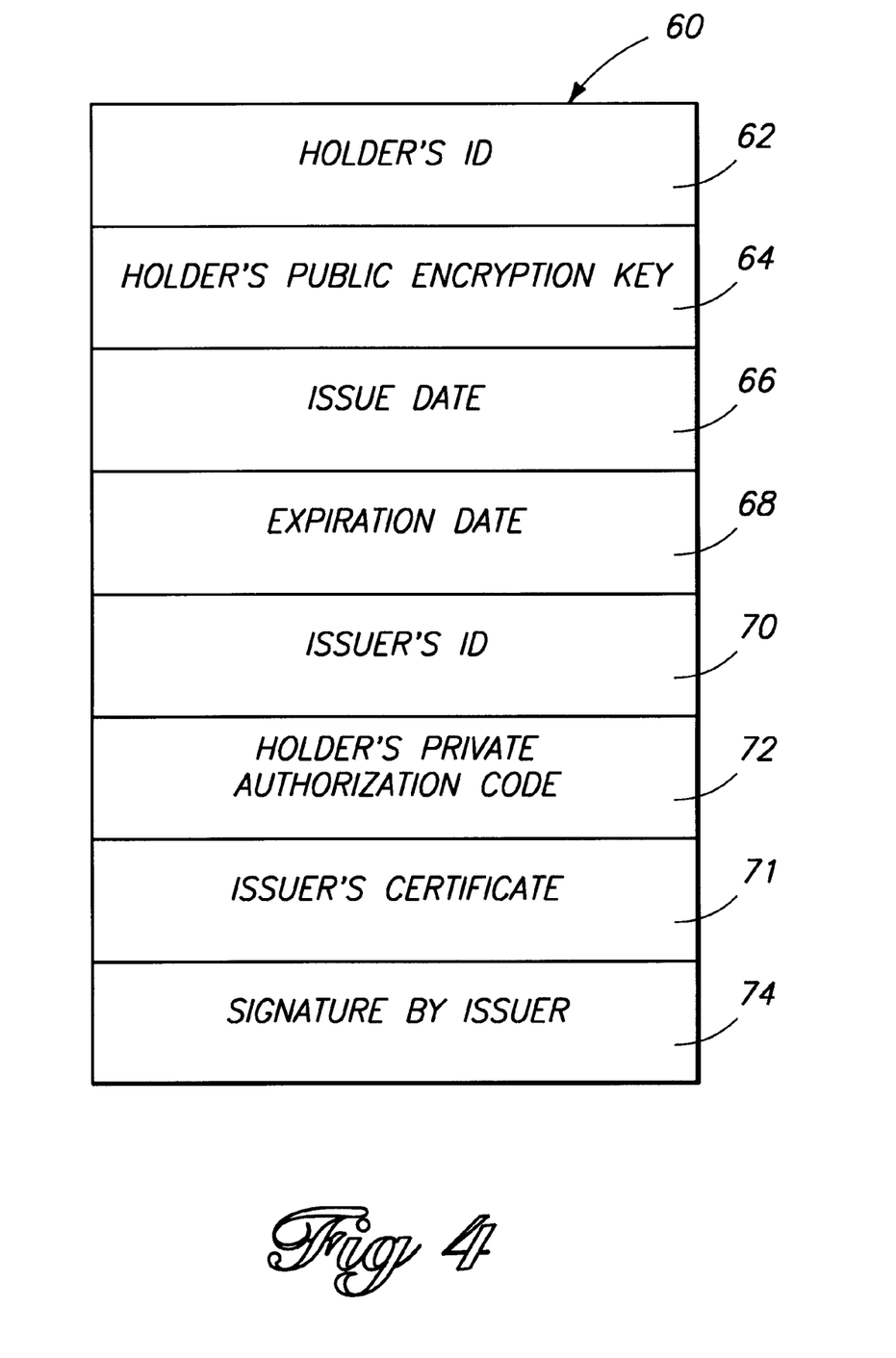
FIG. 4 is illustrates an example of a digital certificate in accordance with the invention.

FIG. 4 shows an example of a digital certificate 60. It includes an identification 62 of the holder of the certificate, the public encryption key 64 of the holder, the date 66 the certificate was issued, the date 68 of its expiration, the privilege authorization code 72 authorized for the holder of the certificate by the certifying authority that issued the certificate, and an identification 70 of the certifying authority that issued the certificate (at the next higher level of the hierarchy). It also includes or refers to the certificate 71 of the certifying authority. Certificate 60 is digitally signed by the certifying authority, using the private signature key of the certifying authority. The digital signature 74 of the certifying authority is appended to and becomes part of the certificate.

The certificate of the root certifying authority is slightly different in that it does not include the certificate or digital signature of any higher authority. Its privilege authorization code indicates all possible privileges.

This scheme results in a chain of digital certificates leading from a distributing authority all the way up the hierarchy to the root certifying authority. The chain of certificates can be traced upward through the hierarchy until reaching the certificate of an authority whose digital signature can be verified without relying on information obtained from the distributing authority.

Referring back to FIG. 3, assume that distributing authority $DA_3$ downloads or otherwise provides a signed executable object that is eventually executed by client computer 46. The object includes credentials of distributing authority $DA_3$, comprising a digital certificate as described above. The digital certificate includes the public signing key of distributing authority $DA_3$, allowing client computer 46 to verify the digital signature performed by distributing authority $DA_3$ on the executable code and the privilege request code. The digital certificate also indicates information relating to the certifying authority $CA_2$ that issued the certificate, including the certificate of certifying authority $CA_2$.

The certificate of distributing authority $DA_3$, issued and signed by nexthigher certifying authority $CA_2$, verifies or confirms the public signing key and the privilege authorization code of distributing authority $DA_3$. The signature and privilege authority of certifying authority $CA_2$ can in turn be verified through information in $CA_2$'s digital certificate, issued by certifying authority $CA_1$.

Now suppose that certifying authority $CA_1$ is known to the client computer, independently of the executable object. If this is the case, client computer 46 can verify the certificate of certifying authority $CA_2$ without tracing any farther up the hierarchy. That is, client computer 46 will know the public signing key of certifying authority $CA_1$, independently of the downloaded executable object, and will thus be able to verify that $CA_1$ signed the digital certificate of certifying authority $CA_2$. Client computer 46 can rely on the known trustworthiness of certifying authority $CA_1$ to confirm the trustworthiness (and digital signature) of $CA_2$, and can then rely on the trustworthiness of $CA_2$ to confirm the trustworthiness (and digital signature) of $CA_3$.

Any certificate (except the certificate of the root authority) can be traced to a higher authority by following the chain of digital certificates up the hierarchy. As used here, the term "tracing" refers to the process of following a chain of digital certificates up through a hierarchy of authorities, while verifying the signature and authority of any particular member of the hierarchy with reference to a certificate that is digitally signed and authorized by a higher level of the hierarchy.

Figure 5:
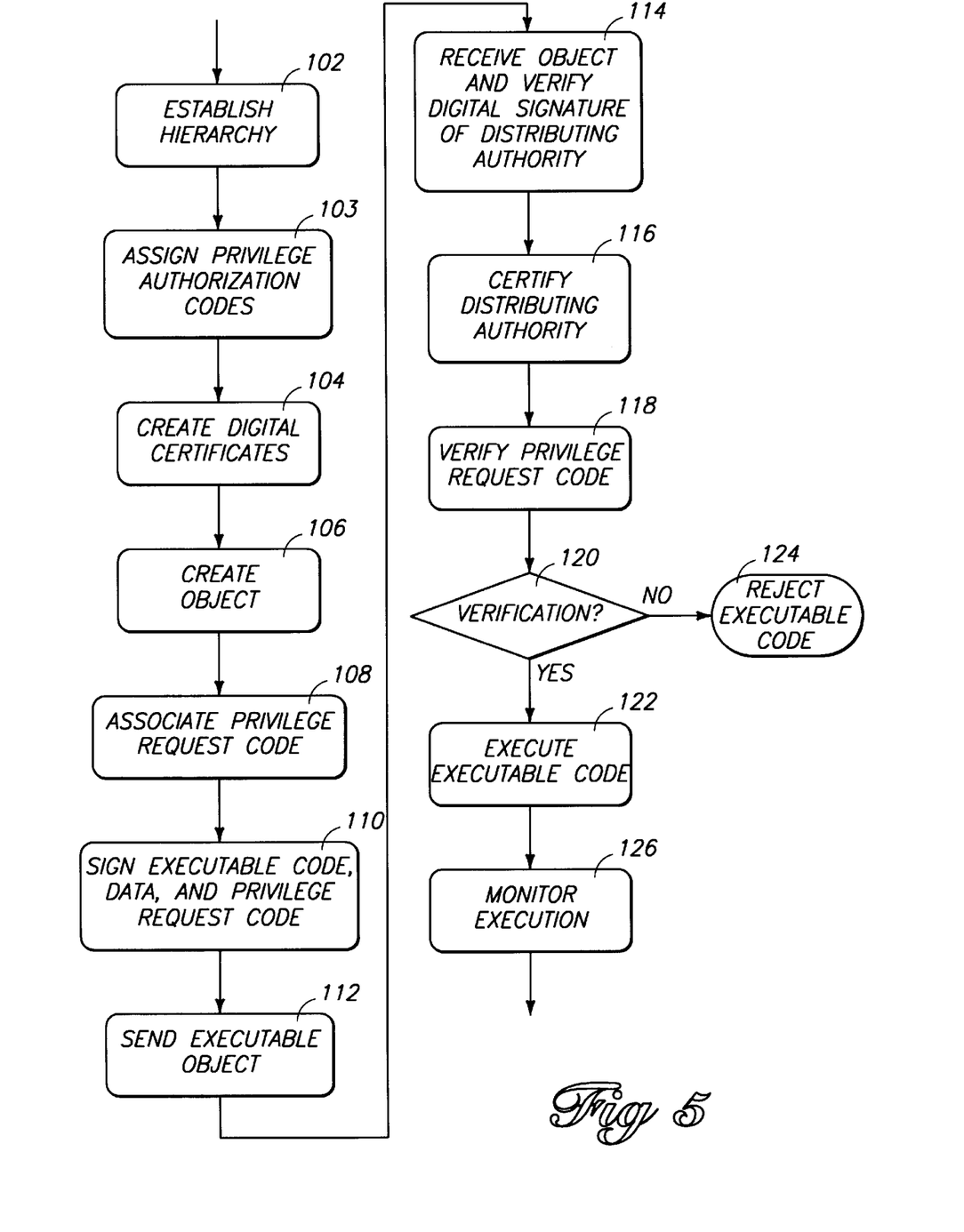
FIG. 5 is a flow chart showing preferred methodical steps in accordance with the invention.

The invention includes a method as illustrated in FIG. 5 of distributing and executing executable objects or code. The method includes a first step 102 of establishing a hierarchy of authorities comprising a plurality of certifying authorities, including the root authority, and a plurality of distributing authorities. The members of the hierarchy are preferably computers connected for communications over a network or other communications medium.

The method includes a step 103 of assigning a privilege authorization code to each member of the hierarchy. The privilege authorization code of any particular member of the hierarchy indicates a set of privileges that the particular member is authorized to incorporate in executable objects that might be provided from that member for execution on other computers. In addition, the privilege authorization code indicates the maximum set of privileges that member can include in the assigned privilege authorization codes of other, lower members of the hierarchy. According to this scheme, the privilege authorization code of any member is assigned to that member by a higher member of the hierarchy, and indicates a subset of the privileges indicated in the privilege authorization code of the higher member.

Step 104 includes creating and signing a digital certificate for each member of the hierarchy, wherein the certificate of any particular member (except that of the root authority) includes or refers to the digital certificate of that higher member. This results in a chain of certificates and corresponding digital signatures, as already described, that can be used for certifying the trustworthiness and authority of any particular member of the hierarchy. The digital certificate of a member also includes the privilege authorization code for that member, assigned to that member by a higher member of the hierarchy.

A step 106, performed by a distributing authority that is a member of the hierarchy of authorities, comprises creating an executable object as shown in FIG. 2. The object includes executable code and optional data, as well as signed credentials of the distributing authority. In the preferred embodiment of the invention, the credentials comprise the digital certificate of the distributing authority, formatted as shown in FIG. 4.

Step 108, also performed by the distributing authority, comprises associating a privilege request code with the executable code and the optional data. The privilege request code indicates a requested set of privileges that the executable code will potentially exercise on a client computer during execution. The requested set of privileges is a subset of the authorized set of privileges indicated the distributing authority's credentials.

A step 110 comprises digitally signing the executable code, any associated data, and the associated privilege request code. This step is performed by the distributing authority, using its private signing key. Specifically, the distributing authority produces an SHA hash of the concatenated executable code, data, and privilege request code, and encrypts the hash using an RSA encryption algorithm in conjunction with the distributing authority's private signing key.

Step 112 comprises sending or otherwise distributing the executable object, including the privilege request code, credentials and digital signature of the distributing authority, from the distributing authority to a client computer. This step might make use of a network communications medium, or might take place using a portable storage medium such as a floppy disk.

Step 114, performed by the client computer, comprises receiving the object sent in step 112 and verifying the digital signature of the distributing authority to confirm the authenticity and integrity of the executable code, associated data, and associated privilege request code. This step is performed by decrypting (using the RSA algorithm) the digital signature with the public signing key of the distributing authority (as set forth in the credentials of the distributing authority) and comparing this with an SHA hash of the concatenated executable code, data, and privilege request code.

Step 116, also performed by the client computer, comprises certifying the trustworthiness of the distributing authority, the validity of the privilege request code, and the authenticity of the distributing authority's credentials. This step includes verifying the digital signature of at least one certifying authority that signed the credentials of the distributing authority, in a way that is not dependent on the trustworthiness of the distributing authority itself. More broadly, this step comprises tracing the chain of digital signatures, contained in the certificate of the distributing authority, to one that can be verified without relying on the trustworthiness of the distributing authority. This involves first verifying the signature of a first member of the hierarchy that signed the credentials or certificate of the distributing authority, then verifying the signature of a second member that signed the certificate of the first member, and so on up the chain of authorities until reaching a digital signature that can be verified without relying on information derived from the certificate of the distributing authority—such as a signature that can be verified using a public signing key that is already known to the client computer.

When tracing the chain of digital signatures, the client computer performs a step of verifying that each particular certificate's indicated authorized set of privileges (indicated by its privilege authorization code) is a subset of the authorized set of privileges indicated in the digital certificate of the next-higher member of the hierarchy that digitally signed the particular certificate.

A further step 118 comprises verifying that the privilege request code included in the executable object indicates a set of requested privileges that is a subset of the privileges indicated by the privilege authorization code of the distributing authority. This step is necessary to ensure that the distributing authority has not exceeded its granted authority.

Decision block 120 indicates the action taken as a result of the verification steps performed by the client computer. If these steps indicate that no certifying or distributing authority has exceeded its granted authority, and that all digital signatures are valid, step 122 is performed of executing the executable code. Otherwise, the executable code is rejected, as indicated by termination block 124.

During execution, as indicated by step 126, the executable code is monitored to prevent it from exercising unauthorized privileges. Specifically, this involves preventing the executable code from exercising any privileges that are not in the requested set of privileges indicated by the privilege request code. This inherently prevents exercise of any privileges that are not in the authorized set of privileges of the certifying authority that signed the certificate of the distributing authority, as well as any privileges not indicated by the privilege authorization codes of the higher certifying authorities encountered while tracing the chain of digital signatures.

The monitoring step can be implemented by an interpreter, if the executable code is a script, or by use of operating system facilities if the executable code is a binary executable. The Windows NT® operating system, for example, allows strict control over which operations can be performed by individual executing programs. In the future, it might be possible to modify the Windows® operating system to integrate more fully with the scheme described herein.

The methods described above are advantageous because they do not require a trust relationship between a server and its client, or even between the distributing authority and the eventual user of the executable code. Maintaining trust relationships with a plurality of servers or distributing authorities would be troublesome because of the potentially great number of such entities. Using the scheme described above, however, a client can maintain a trust relationship with a fewer number of certifying authorities at higher levels of the hierarchy, and rely on the enforceable safety and security policy maintained by the root authority and other certifying authorities within the hierarchy.

As a further feature, each client can maintain its own database describing the sets of privileges the client is willing to grant different authorities. Each such set is indicated by a signer-specific privilege code, indicating a signer-specific set of privileges. These sets exist independently of any downloaded executable code. Before executing any particular executable object, the client identifies all members whose certificates have been referred to in the credentials of the distributing authority. This includes the certificates of all hierarchy members in the chain of authorities above the distributing authority, all the way up to the root authority. The client then checks its database to see whether any signer-specific privilege codes exist for these members, and takes the intersection of the privileges indicated by any such signer-specific privilege codes. The executable object is prevented from exercising any privileges that are not in this intersection.

In practice, the client creates a granted privilege set for a particular executable object, and prevents the object from exercising any privileges not in the granted privilege set. The granted privilege set is preferably created by intersecting the privilege authorization sets from the digital certificate of the distributing authority and of any higher members encountered while tracing the certificate of the distributing authority. If signer-specific privilege sets exist for any of these hierarchy members, they are intersected with the results of the previous intersection, and the executable object is prevented from executing any privileges not included in the resulting intersection set.

It is advantageous to maintain privilege sets as bit vectors: multi-bit codes wherein each bit corresponds to a specific privilege or classification of privileges. Using this format, intersections can be easily performed by simple logical operations, such as logically ANDing the vectors.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of distributing and executing executable code, comprising:

creating digital certificates for a plurality of distributing authorities, each such digital certificate indicating an authorized set of privileges for its distributing authority;

associating a privilege request code with the executable code, the privilege request code indicating a requested set of privileges that the executable code will potentially exercise during execution;

defining signer-specific privilege sets at a client computer for different ones of the plurality of distributing authorities, each signer-specific privilege set indicating privileges allowed to executable code signed by the corresponding distributing authority;

digitally signing the executable code and associated privilege request code by a particular one of the plurality of distributing authorities;

receiving the executable code, associated privilege request code, and digital signature at the client computer;

preventing the executable code from executing if the digital signature of the executable code and associated privilege request code cannot be verified;

preventing the executable code from executing if the privilege request code indicates privileges that are not in the signer-specific privilege set of the distributing authority that signed the executable code.

2. A method as recited in claim 1, further comprising preventing the executable code from exercising privileges that are not indicated by the privilege request code.

3. A method as recited in claim 1, further comprising:

digitally signing the digital certificate of said particular distributing authority by one or more certifying authorities;

before executing the executable code, verifying the digital signature of at least one of the certifying authorities without relying on the trustworthiness of said particular distributing authority.

4. A method as recited in claim 1, further comprising:

certifying the trustworthiness of said particular distributing authority with a chain of digital signatures by one or more certifying authorities;

associating the chain of digital signatures with the executable code;

before executing the executable code, tracing the chain of digital signatures to one that can be verified without relying on the trustworthiness of said particular distributing authority.

5. A method as recited in claim 1, wherein said particular distributing authority is a memory of a hierarchy of authorities, further comprising the following step:

creating digital certificates for members of the hierarchy, wherein the digital certificate of a particular member is signed by a higher member of the hierarchy and refers to the signed digital certificate of said higher member.

6. A method as recited in claim 1, wherein said particular distributing authority is a memory of a hierarchy of authorities, further comprising the following steps:

creating digital certificates for members of the hierarchy, wherein the digital certificate of a particular member is signed by a higher member of the hierarchy and refers to the signed digital certificate of said higher member;

before executing the executable code, tracing the digital certificate of the distributing authority that signed the executable code to an upper member of the hierarchy of authorities whose digital signature can be verified without relying on the trustworthiness of said particular distributing authority.

7. A method as recited in claim 1, wherein said distributing authority is a memory of a hierarchy of authorities, further comprising the following steps:

creating digital certificates for members of the hierarchy, wherein the digital certificate of a particular member is signed by a higher member of the hierarchy and refers to the signed digital certificate of said higher member;

before executing the executable code, tracing the digital certificate of said particular distributing authority to an upper member of the hierarchy of authorities whose digital signature can be verified without relying on the trustworthiness of said particular distributing authority;

when tracing the digital certificate of said particular distributing authority, verifying that each particular certificate's indicated authorized set of privileges is a subset of the authorized set of privileges indicated in the digital certificate of the higher member that digitally signed the particular digital certificate.

8. A method of distributing and executing executable code, comprising:

creating digital certificates for a plurality of distributing authorities, each such digital certificate indicating an authorized set of privileges for its distributing authority;

defining signer-specific privilege sets at a client computer for different ones of the distributing authorities, each signer-specific privilege set indicating privileges allowed to executable code signed by the corresponding distributing authority;

digitally signing the executable code by one of the plurality of distributing authorities;

receiving the executable code and digital signature at the client computer;

preventing the executable code from executing if the digital signature of the executable code cannot be verified;

preventing the executable code from exercising privileges that are not in both (a) the authorized set of privileges from the digital certificate of the distributing authority that signed the executable code and (b) the signer-specific privilege set corresponding to the distributing authority that signed the executable code.

9. A method as recited in claim 8, further comprising:

digitally signing the digital certificate by one or more certifying authorities;

before executing the executable code, verifying the digital signature of at least one of the certifying authorities without relying on the trustworthiness of the distributing authority.

10. A method as recited in claim 8, further comprising;

certifying the trustworthiness of the distributing authority that signs the executable code with a chain of digital signatures by one or more certifying authorities;

associating the chain of digital signatures with the executable code;

before executing the executable code, tracing the chain of digital signatures to one that can be verified without relying on the trustworthiness of the distributing authority that signs the executable code.

11. A method as recited in claim 8, wherein the distributing authority that signs the executable code is a memory of a hierarchy of authorities, further comprising the following step:

creating digital certificates for members of the hierarchy, wherein the digital certificate of a particular member is signed by a higher member of the hierarchy and refers to the signed digital certificate of said higher member.

12. A method as recited in claim 8, wherein the distributing authority that signs the executable code is a memory of a hierarchy of authorities, further comprising the following steps:

creating digital certificates for members of the hierarchy, wherein the digital certificate of a particular member is signed by a higher member of the hierarchy and refers to the signed digital certificate of said higher member;

before executing the executable code, tracing the digital certificate of the distributing authority that signed the executable code to an upper member of the hierarchy of authorities whose digital signature can be verified without relying on the trustworthiness of the distributing authority that signed the executable code.

13. A method as recited in claim 8, wherein the distributing authority that signs the executable code is a memory of a hierarchy of authorities, further comprising the following steps:

creating digital certificates for members of the hierarchy, wherein the digital certificate of a particular member is signed by a higher member of the hierarchy and refers to the signed digital certificate of said higher member;

before executing the executable code, tracing the digital certificate of the distributing authority that signed the executable code to an upper member of the hierarchy of authorities whose digital signature can be verified without relying on the trustworthiness of the distributing authority that signed the executable code;

when tracing the digital certificate of the distributing authority that signed the executable code, verifying that each particular certificate's indicated authorized set of privileges is a subset of the authorized set of privileges indicated in the digital certificate of the higher member that digitally signed the particular digital certificate.

14. One or more computer programs stored on one or more computer-readable storage media for execution by a client computer, the one or more programs comprising the following steps:

defining signer-specific privilege sets at the client computer for different ones of a plurality of distributing authorities, each signer-specific privilege set indicating privileges allowed to executable code signed by the corresponding distributing authority;

receiving executable code and an associated privilege request code, the executable code and associated privilege request code being digitally signed by a particular one of the distributing authorities;

preventing the executable code from executing if the digital signature of the executable code and associated privilege request code cannot be verified;

preventing the executable code from executing if the privilege request code indicates privileges that are not in the signer-specific privilege set corresponding to the distributing authority that signed the executable code.

15. One or more computer programs stored on one or more computer-readable storage media as recited in claim 14, the one or more programs further comprising a step of preventing the executable code from exercising privileges that are not indicated by the privilege request code.

16. One or more computer programs stored on one or more computer-readable storage media as recited in claim 14, wherein said particular one of the distributing authorities produces a digital certificate indicating an authorized set of privileges, the one or more programs further comprising a step of preventing the executable code from exercising privileges that are not in the authorized set of privileges indicated by the digital certificate.

17. One or more computer programs stored on one or more computer-readable storage media as recited in claim 16, wherein the digital certificate is digitally signed by one or more certifying authorities, said one or more computer programs further comprising:

before executing the executable code, verifying the digital signature of at least one of the certifying authorities without relying on the trustworthiness of said particular one of the distributing authorities.

18. One or more computer programs stored on one or more computer-readable storage media as recited in claim 16, wherein the trustworthiness of said particular one of the distributing authorities is certified with a chain of digital signatures by one or more certifying authorities, the chain of digital signatures being associated with the executable code, said one or more computer programs further comprising:

before executing the executable code, tracing the chain of digital signatures to one that can be verified without relying on the trustworthiness of the distributing authority.

19. One or more computer programs stored on one or more computer-readable storage media as recited in claim 16, wherein the distributing authority that signs the executable code is a memory of a hierarchy of authorities, the members of the hierarchy having digital certificates, wherein the digital certificate of a particular member is signed by a higher member of the hierarchy and refers to the signed digital certificate of said higher member, said one or more computer programs further comprising the following step:

before executing the executable code, tracing the digital certificate of the distributing authority that signed the executable code to an upper member of the hierarchy of authorities whose digital signature can be verified without relying on the trustworthiness of the distributing authority that signed the executable code.

20. One or more computer programs stored on one or more computer-readable storage media as recited in claim 16, wherein the distributing authority that signs the executable code is a memory of a hierarchy of authorities, the members of the hierarchy having digital certificates, wherein the digital certificate of a particular member is signed by a higher member of the hierarchy and refers to the signed digital certificate of said higher member, said one or more computer programs further comprising the following step:

before executing the executable code, tracing the digital certificate of the distributing authority that signed the executable code to an upper member of the hierarchy of authorities whose digital signature can be verified without relying on the trustworthiness of the distributing authority that signed the executable code;

when tracing the digital certificate of the distributing authority that signed the executable code, verifying that each particular certificate's indicated authorized set of privileges is a subset of the authorized set of privileges indicated in the digital certificate of the higher member that digitally signed the particular digital certificate.

\* \* \* \* \*